United States Patent
Han (10) Patent No.: US 10,490,862 B2
(45) Date of Patent: Nov. 26, 2019

(54) SECONDARY BATTERY WITH FLEXIBLE CIRCUIT PORTION

(71) Applicant: Samsung SDI Co., Ltd., Yongin-si, Gyeonggi-do (KR)

(72) Inventor: Jongchan Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 93 days.

(21) Appl. No.: 15/624,483

(22) Filed: Jun. 15, 2017

(65) Prior Publication Data
US 2018/0097260 A1 Apr. 5, 2018

(30) Foreign Application Priority Data
Oct. 5, 2016 (KR) ................. 10-2016-0128567

(51) Int. Cl.
*H01M 10/42* (2006.01)
*H01M 10/647* (2014.01)
(Continued)

(52) U.S. Cl.
CPC ....... *H01M 10/4257* (2013.01); *H01M 2/029* (2013.01); *H01M 2/0287* (2013.01);
(Continued)

(58) Field of Classification Search
CPC .. H01M 10/4257; H01M 2/0287; H01M 2/26; H01M 2/029; H01M 10/647; H01M 2/0275; H01M 2220/30
See application file for complete search history.

(56) References Cited

U.S. PATENT DOCUMENTS 6,368,744 B1 4/2002 Hatazawa et al.
2011/0086242 A1* 4/2011 Lee .............. H01M 2/021
429/7
(Continued)

FOREIGN PATENT DOCUMENTS

JP 3899499 B2 1/2007
KR 10-2013-0065291 A 6/2013
(Continued)

*Primary Examiner* — Barbara L Gilliam
*Assistant Examiner* — Kwang Han
(74) *Attorney, Agent, or Firm* — Lewis Roca Rothgerber Christie LLP (57) ABSTRACT

A secondary battery includes: an electrode assembly including a positive electrode plate, a negative electrode plate, and a separator between the positive electrode plate and the negative electrode plate; a case accommodating the electrode assembly; a negative electrode lead and a positive electrode lead extending from the case and being respectively connected to the negative electrode plate and the positive electrode plate of the electrode assembly; a rigid circuit portion including a plurality of connection portions and an external connection terminal, the connection portions being respectively connected to the negative electrode lead and the positive electrode lead; and a flexible circuit portion including a bypass circuit pattern connecting the connection portions and the external connection terminal of the rigid circuit portion to each other, the flexible circuit portion being curved between a first side surface of the case and the rigid circuit portion.

10 Claims, 8 Drawing Sheets

(51) Int. Cl.
  *H01M 2/02*   (2006.01)
  *H01M 2/26*   (2006.01)
(52) U.S. Cl.
  CPC .......... *H01M 2/26* (2013.01); *H01M 10/647* (2015.04); *H01M 2/0275* (2013.01); *H01M 2220/30* (2013.01)

(56) References Cited

U.S. PATENT DOCUMENTS

| | | | |
|---|---|---|---|
| 2013/0011700 A1* | 1/2013 | Park | H01M 2/1077 429/7 |
| 2013/0149563 A1 | 6/2013 | Lee et al. | |
| 2016/0028047 A1 | 1/2016 | Park | |
| 2016/0372796 A1* | 12/2016 | Nishihara | H01M 2/1061 |

FOREIGN PATENT DOCUMENTS

| | | | |
|---|---|---|---|
| KR | 10-2016-0013758 A | 2/2016 | |
| WO | WO-2015107583 A1 * | 7/2015 | .......... H01M 2/1061 |

\* cited by examiner

SECONDARY BATTERY WITH FLEXIBLE CIRCUIT PORTION

CROSS-REFERENCE TO RELATED APPLICATION

This application claims priority to and the benefit of Korean Patent Application No. 10-2016-0128567, filed on Oct. 5, 2016 in the Korean Intellectual Property Office, the disclosure of which is incorporated herein in its entirety by reference.

BACKGROUND

1. Field

Aspects of embodiments of the present invention relate to a secondary battery.

2. Description of the Related Art

In general, a secondary battery denotes a battery that is rechargeable, unlike a primary battery that is not designed to be rechargeable. Secondary batteries are widely used in small-sized electronic devices, such as mobile phones, personal digital assistants (PDAs), laptop computers, etc.

Because a secondary battery is used for a long time period and goes through many charging/discharging operations, a reliability test according to an environment in which the secondary battery is to be used is important. Representative reliability tests may include a durability test according to temperature, a strength test, an electrostatic discharge (ESD) test, and charging and discharging tests. The strength of a battery may refer to electrical characteristics, as well as mechanical characteristics, of the battery. For example, if an electrical short-circuit occurs due to an external shock or impact applied to the battery or if there is a coupling problem between elements, the secondary battery may not normally operate.

SUMMARY

One or more embodiments of the present invention include a secondary battery including an electrode assembly in a pouch-type case.

Additional aspects will be set forth, in part, in the description which follows and, in part, will be apparent from the description or may be learned by practice of the presented embodiments.

According to an embodiment, a secondary battery includes: an electrode assembly including a positive electrode plate, a negative electrode plate, and a separator between the positive electrode plate and the negative electrode plate; a case accommodating the electrode assembly; a negative electrode lead and a positive electrode lead extending from the case, the negative electrode lead and the positive electrode lead being respectively connected to the negative electrode plate and the positive electrode plate of the electrode assembly; a rigid circuit portion including a plurality of connection portions and an external connection terminal, the connection portions being respectively connected to the negative electrode lead and the positive electrode lead; and a flexible circuit portion including a bypass circuit pattern connecting the connection portions and the external connection terminal of the rigid circuit portion to each other. The flexible circuit portion is curved between a first side surface of the case and the rigid circuit portion.

The case may include a metal thin film layer, a first insulating thin film layer on a first surface of the metal thin film layer, and a second insulating thin film layer on a second surface of the metal thin film layer opposite to the first surface.

The flexible circuit portion may include an insulation layer covering the bypass circuit pattern.

The flexible circuit portion may include a first sub-flexible circuit portion directly connected to the rigid circuit portion and a second sub-flexible circuit portion connected to the first sub-flexible circuit portion. The bypass circuit pattern may extend through the first sub-flexible circuit portion and the second sub-flexible circuit portion.

The flexible circuit portion may be curved to be in a gap between the first side surface of the case and the rigid circuit portion.

A first end portion of the flexible circuit portion may be connected to the rigid circuit portion, and a second end portion of the flexible circuit portion opposite to the first end portion may extend substantially parallel to the first side surface.

The case may be a pouch-type case including a terrace portion that is arranged adjacent to one of the side surfaces.

A first end portion of the flexible circuit portion may be connected to the rigid circuit portion, and a second end portion of the flexible circuit portion opposite to the first end portion may extend to be between the rigid circuit portion and the terrace portion.

The rigid circuit portion may include a circuit board parallel to the terrace portion and a protective device on a first surface of the circuit board that faces the terrace portion.

The connection portions may be on a second surface of the circuit board, which may be opposite the first surface.

BRIEF DESCRIPTION OF THE DRAWINGS

These and/or other aspects of the present invention will become apparent and more readily appreciated from the following description of exemplary embodiments, taken in conjunction with the accompanying drawings, in which.

DETAILED DESCRIPTION

As the present disclosure allows for various changes and numerous embodiments, particular exemplary embodiments will be illustrated in the drawings and described, in detail, in the written description. The attached drawings illustrate aspects of embodiments and are referred to in order to provide a sufficient understanding of the present invention. However, the present invention may have different forms and should not be construed as being limited to the exemplary embodiments set forth herein.

The exemplary embodiments will be described below in more detail with reference to the accompanying drawings. Those components that are the same or are in correspondence are indicated by the same reference numeral regardless of the figure number, and redundant explanations thereof may be omitted.

While terms, such as "first," "second," etc., may be used to describe various components, such components are not limited to such terms. The above terms are used to distinguish one component from another.

An expression used in the singular encompasses the expression of the plural, unless it has a clearly different meaning in the context.

In the present specification, it is to be understood that terms, such as "including," "having," and "comprising," are intended to indicate the existence of the features, numbers, steps, actions, components, parts, or combinations thereof disclosed in the specification but are not intended to preclude the possibility that one or more other features, numbers, steps, actions, components, parts, or combinations thereof may exist or may be added.

It will be understood that when a layer, region, or component is referred to as being "on" or "formed on" another layer, region, or component, it can be directly or indirectly on or formed on the other layer, region, or component. For example, intervening layers, regions, or components may be present.

Sizes of components in the drawings may be exaggerated for convenience of explanation, and because sizes and thicknesses of components in the drawings may be arbitrarily illustrated for convenience of explanation, the following embodiments are not limited thereto.

When a certain embodiment may be implemented differently, a specific process order may be performed differently from the described order. For example, two consecutively described processes may be performed at substantially the same time or performed in an order opposite to the described order.

In the embodiments below, it will be understood when layers, areas, or elements or the like are referred to as being "coupled" or "connected," they can be directly coupled or connected or an intervening portion may be present between layers, areas, or elements. For example, when layers, areas, or elements or the like are referred to as being "electrically coupled" or "electrically connected," they can be directly electrically coupled or electrically connected, or layers, areas, or elements may be indirectly electrically connected and an intervening portion may be present therebetween.

As used herein, the term "and/or" includes any and all combinations of one or more of the associated listed items. Expressions, such as "at least one of," when preceding a list of elements, modify the entire list of elements and do not modify the individual elements of the list. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

Figure 1:
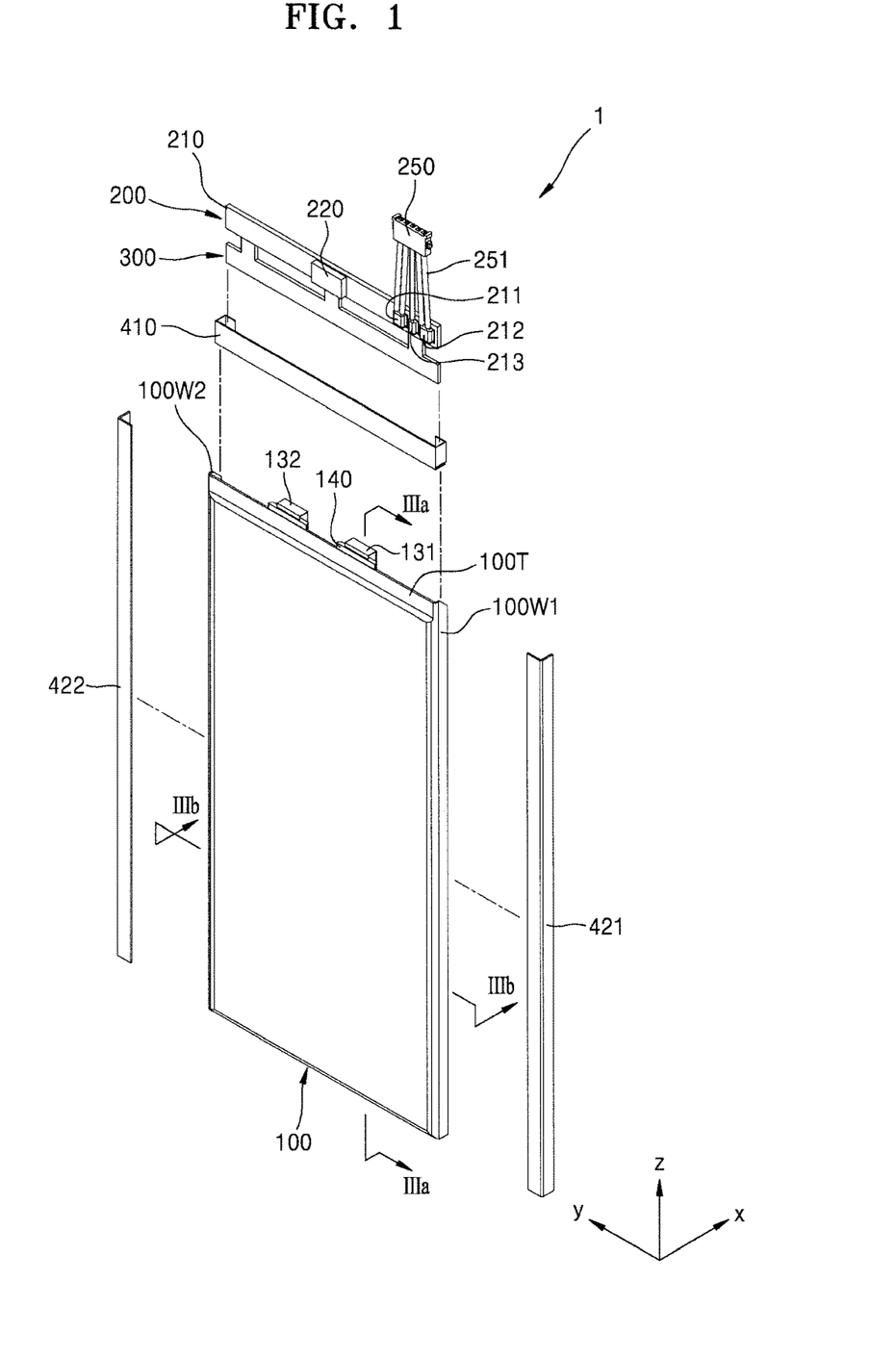
FIG. 1 is an exploded perspective view of a secondary battery according to an embodiment.
Figure 2:
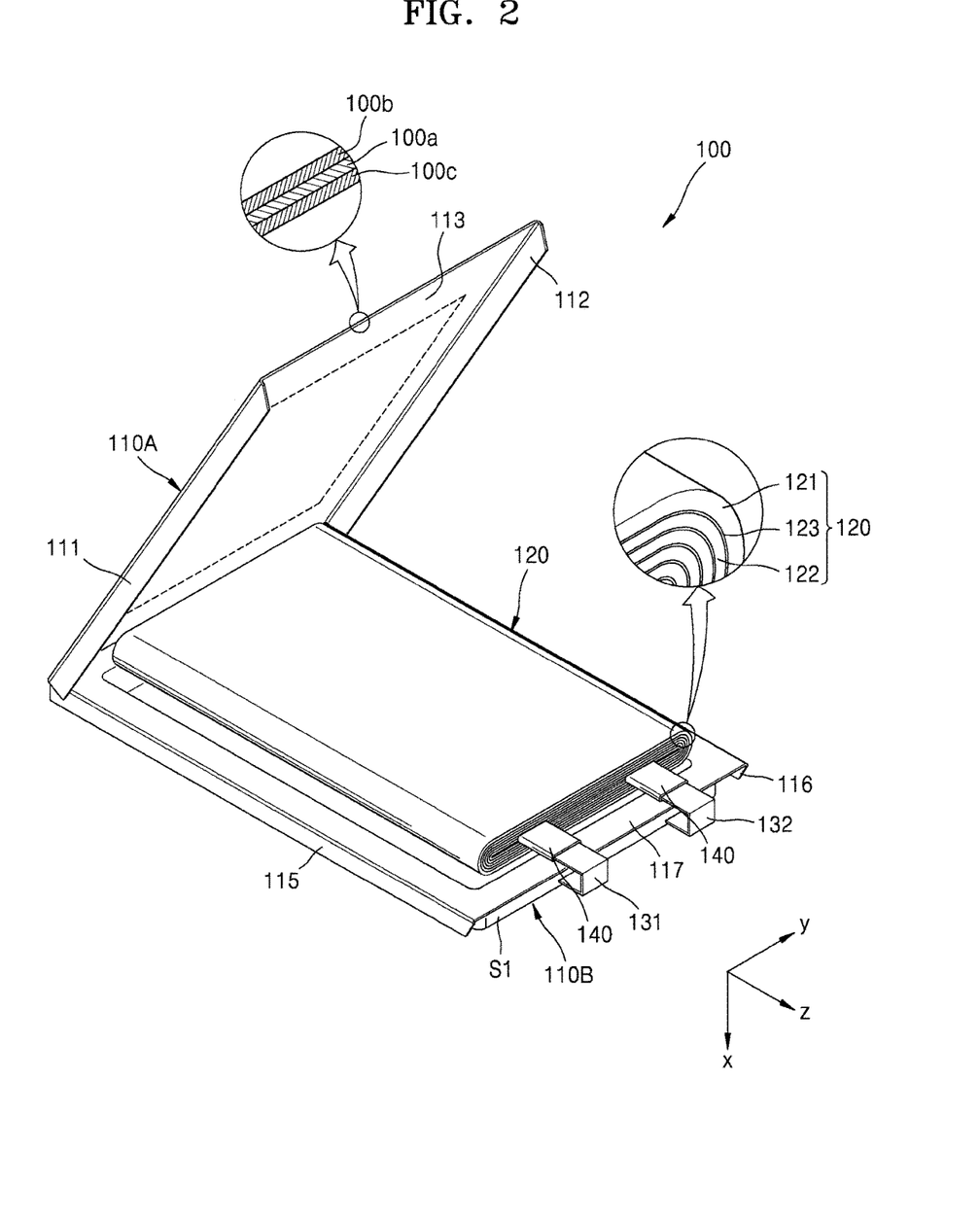
FIG. 2 is an exploded perspective view of a battery cell shown in FIG. 1.
Figure 3A:
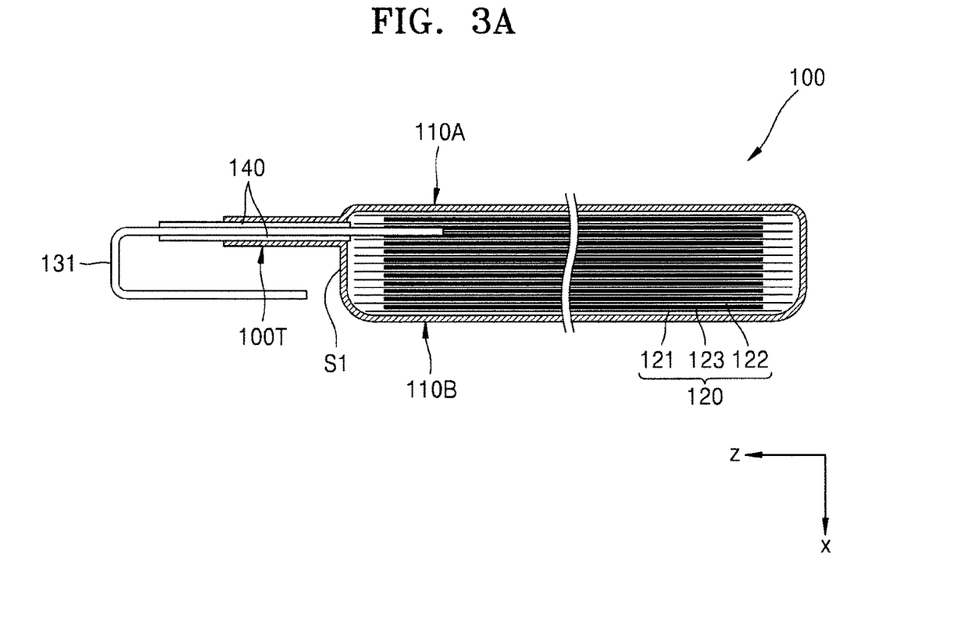
FIG. 3A is a cross-sectional view of the battery cell taken along the line IIIa-IIIa of FIG. 1.
Figure 3B:
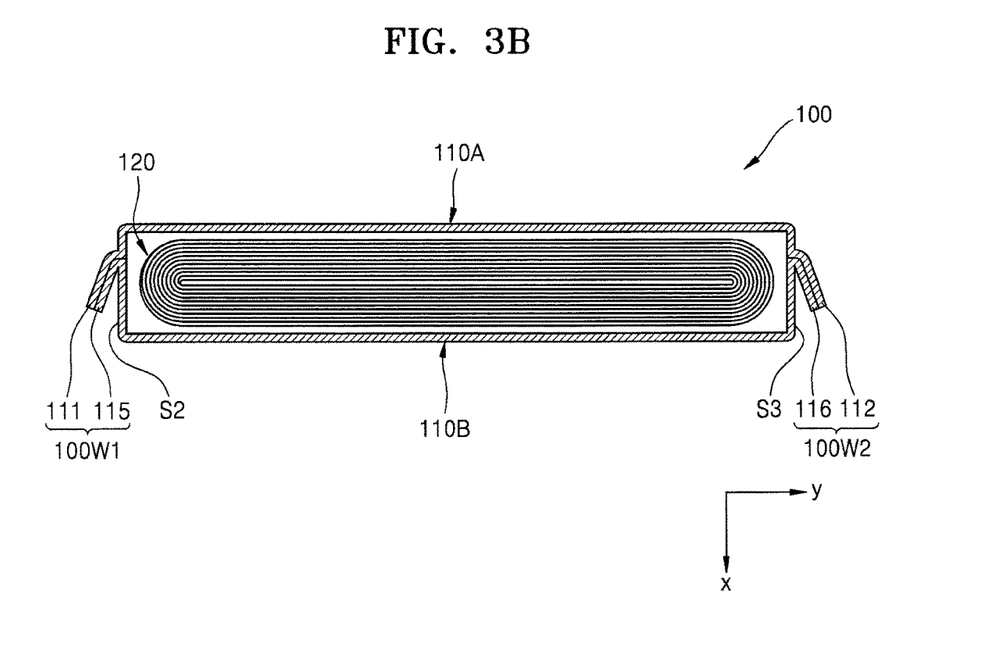
FIG. 3B is a cross-sectional view of the battery cell taken along the line IIIb-IIIb of FIG. 1.

FIG. 1 is an exploded perspective view of a secondary battery 1 according to an embodiment, FIG. 2 is an exploded perspective view of a battery cell shown in FIG. 1, FIG. 3A is a cross-sectional view of the battery cell taken along the line IIIa-IIIa of FIG. 1, and FIG. 3B is a cross-sectional view of the battery cell taken along the line IIIb-IIIb of FIG. 1.

Referring to FIG. 1, the secondary battery 1 may include a battery cell 100, a rigid circuit portion (e.g., a rigid circuit board) 200, a flexible circuit portion (e.g., a flexible circuit board) 300, and an insulation sheet (e.g., an insulation film) 410.

The battery cell 100 may be a pouch-type battery cell. Referring to FIGS. 1-3B, the battery cell 100 includes an electrode assembly 120. The electrode assembly 120 is arranged at an internal side of (e.g., is accommodated in) an exterior material 110 (e.g., is arranged inside a pouch-type case).

The electrode assembly 120 includes a negative electrode plate 121, a positive electrode plate 122, and a separator 123 between the negative electrode plate 121 and the positive electrode plate 122. The electrode assembly 120 may have a jelly-roll structure that is wound cylindrically or a stack structure in which the negative electrode plate 121 and the positive electrode plate 122 are alternately stacked with the separator 123 interposed therebetween. According to some embodiments, the negative electrode plate 121 may be a copper foil coated with a negative electrode active material, such as graphite, and the positive electrode plate 122 may be an aluminum foil coated with a positive electrode active material, such as lithium cobalt oxide ($LiCoO_2$). However, the present invention is not limited thereto. The separator 123 is between the negative electrode plate 121 and the positive electrode plate 122 to prevent a short-circuit from occurring therebetween while allowing lithium ions to move therebetween.

The pouch-type case 110 includes a multi-layered film including a metal thin film layer 110a including aluminum or stainless steel and first and second insulating thin film layers 110b and 110c, and the multi-layered film may be formed as a pouch when an upper portion 110A and a lower portion 110B of the pouch-type case 110 are coupled to each other with the electrode assembly 120 interposed therebetween.

At least one of the upper portion 110A and the lower portion 110B of the pouch-type case 110, in some embodiments, the lower portion 110B, may have an internal space having a shape corresponding to the electrode assembly 120. The at least one of the upper portion 110A and the lower portion 110B having the shape corresponding to the electrode assembly 120 may have side surfaces S1, S2, and S3 as shown in FIGS. 3A and 3B.

The upper portion 110A and the lower portion 110B of the pouch-type case 110 may seal the electrode assembly 120 by being bonded to each other at edges 111, 112, 113, 115, 116, and 117 by a method, such as a thermosetting method. For example, from among the edges 111, 112, 113, 115, 116, and 117 of the upper portion 110A and the lower portion 110B, the edges 111, 112, 115, and 116 that are opposite to each other when the electrode assembly 120 is interposed therebetween are bonded to each other by, for example, the thermosetting method to form wing portions 100W1 and 100W2 of the battery cell 100. The edges 113 and 117 adjacent to a negative electrode lead 131 and a positive electrode lead 132 connected to the electrode assembly 120 are bonded by, for example, the thermosetting method to form a terrace portion 100T. The wing portions 100W1 and 100W2 of the battery cell 100 may be respectively covered by insulation tapes 241 and 242 as shown in FIG. 1.

The negative electrode lead 131 and the positive electrode lead 132 are respectively connected to the negative electrode plate 121 and the positive electrode plate 122 of the electrode assembly 120 and extend outside of the pouch-type case 110, beyond (e.g., through) the terrace portion 100T. Some portions of the negative electrode lead 131 and the positive electrode lead 132, which overlap with (or extend through) the terrace portion 100T, may be covered by an insulation tape 140.

The negative electrode lead 131 and the positive electrode lead 132 are connected to the rigid circuit portion 200 outside the pouch-type case 110 to electrically connect the electrode assembly 120 to the rigid circuit portion 200. The rigid circuit portion 200 includes connection portions 231 and 232 (see, e.g., FIG. 5) for connecting to the negative electrode lead 131 and the positive electrode lead 132.

The rigid circuit portion 200 may include a rigid circuit board 210, a protective device 220 mounted on the circuit board 210, and a connector 250.

The protective device 220 may include electronic devices for controlling charging/discharging of the secondary battery 1 and/or for preventing (or for reducing the chance of) over-discharging and over-charging of the secondary battery 1. For example, the protective device 220 may include a positive thermal coefficient (PTC) that blocks electric current when a temperature of the battery cell 100 exceeds an allowable temperature. The protective device 220 may be arranged to face the terrace portion 100T of the battery cell 100, and an insulation sheet 410 may be arranged between the protective device 220 and the terrace portion 100T.

The connector 250 connects an external device to the secondary battery 1. The external device may include (or may be) an electronic device, such as a laptop computer, a tablet personal computer (PC), a mobile phone, etc., or a device, such as a charger. The connector 250 is connected to external connection terminals 211, 212, and 213 of the circuit board 210 via cables 251. Some of the external connection terminals (e.g., the external connection terminals 211 and 213) from among the external connection terminals 211, 212, and 213 respectively correspond to a negative electrode and a positive electrode, and the other external connection terminal (e.g., the external connection terminal 212) may correspond to a ground.

The secondary battery 1 includes a circuit pattern for a charging operation. For example, the circuit pattern may include a circuit pattern for rapid charging, and the circuit pattern for the rapid charging may be formed throughout the rigid circuit board 210 and the flexible circuit portion 300 to sufficiently ensure a line width for performing the rapid charging. To ensure rapid charging, the flexible circuit portion 300 may be connected to the circuit board 210 of the rigid circuit portion 200.

The flexible circuit portion 300 is arranged between the rigid circuit portion 200 and a side surface of the pouch-type case 110 (e.g., a first side surface S1 of the lower portion 100B of the pouch-type case 110) (see, e.g., FIG. 2), on the terrace portion 100T of the battery cell 100, in order to function as a buffer for preventing or reducing damage to the pouch-type case 110 due to the rigid circuit portion 200.

Figure 4A:
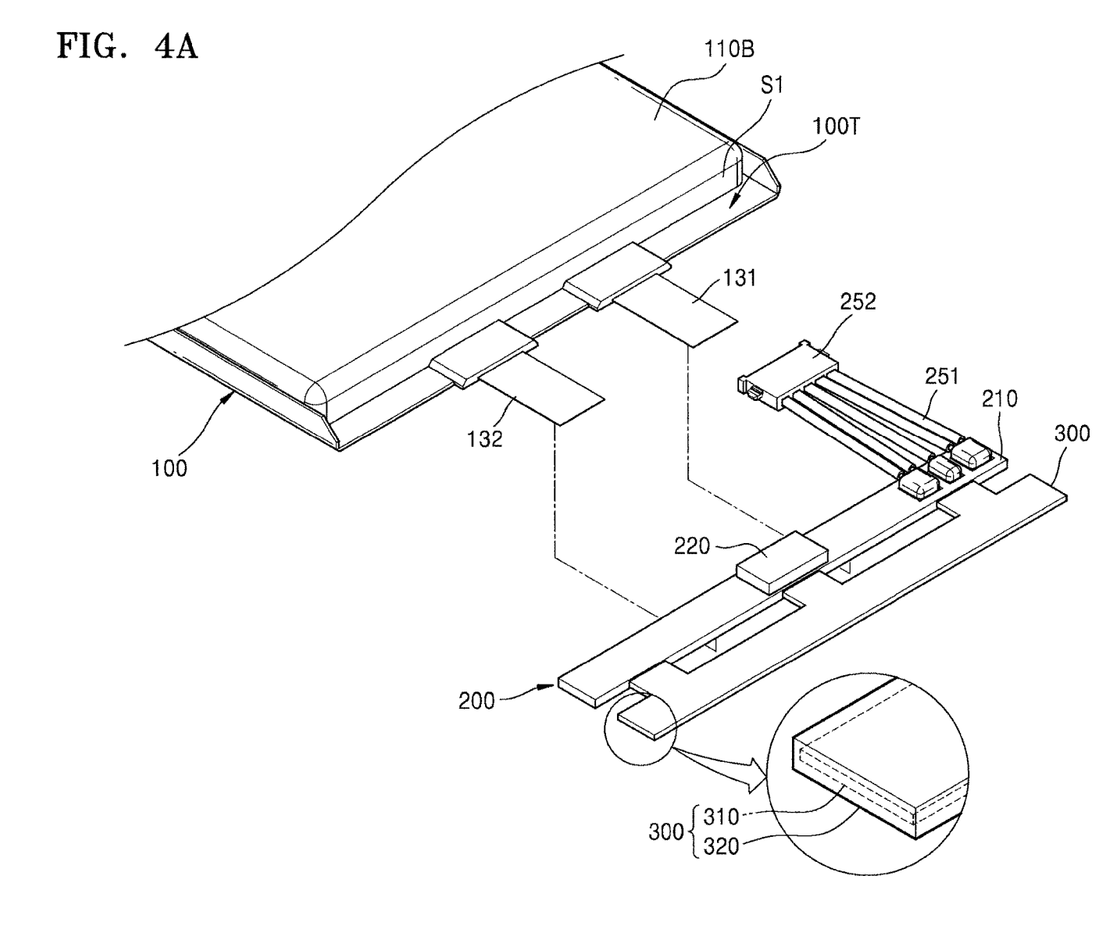
FIGS. 4A and 4B are perspective views schematically illustrating a circuit portion including a rigid circuit portion and a flexible circuit portion and assembly processes of a battery cell.
Figure 4B:
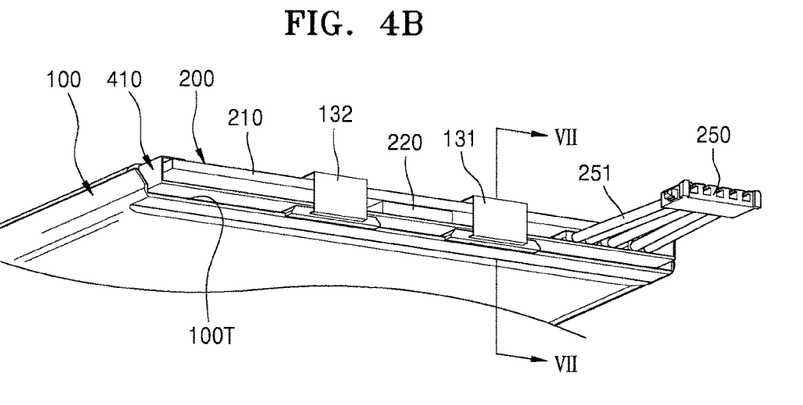
Figure 5:
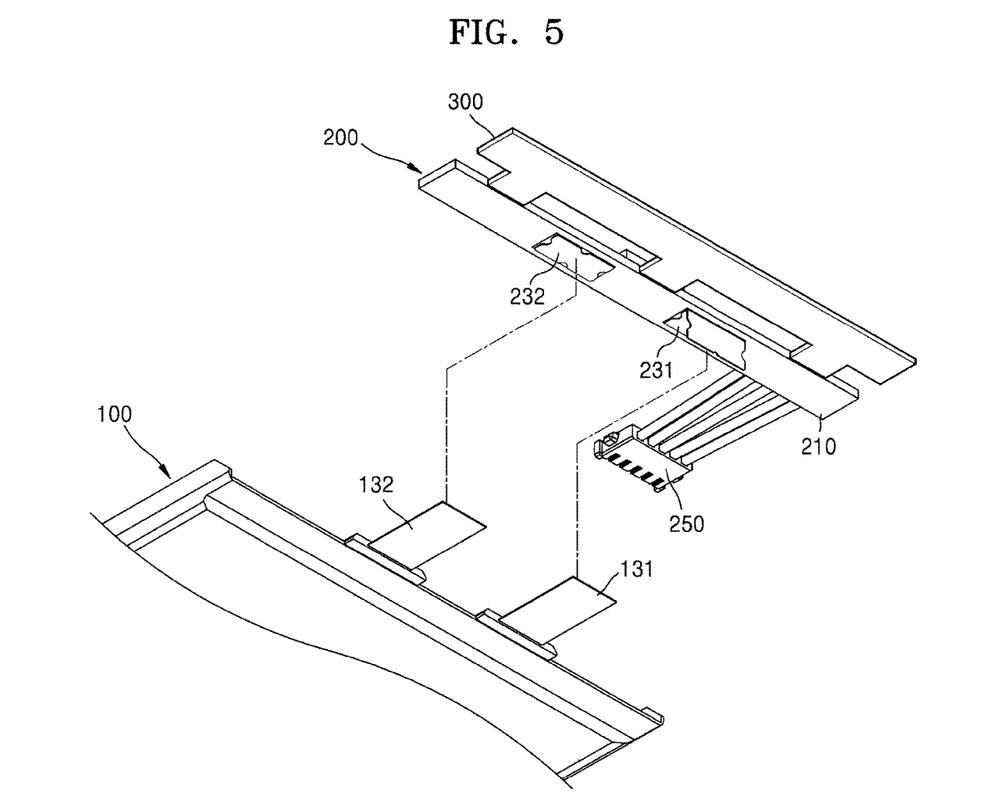
FIG. 5 is a perspective view of the circuit portion including the rigid circuit portion and the flexible circuit portion shown in FIG. 4A from a different angle.
Figure 6:
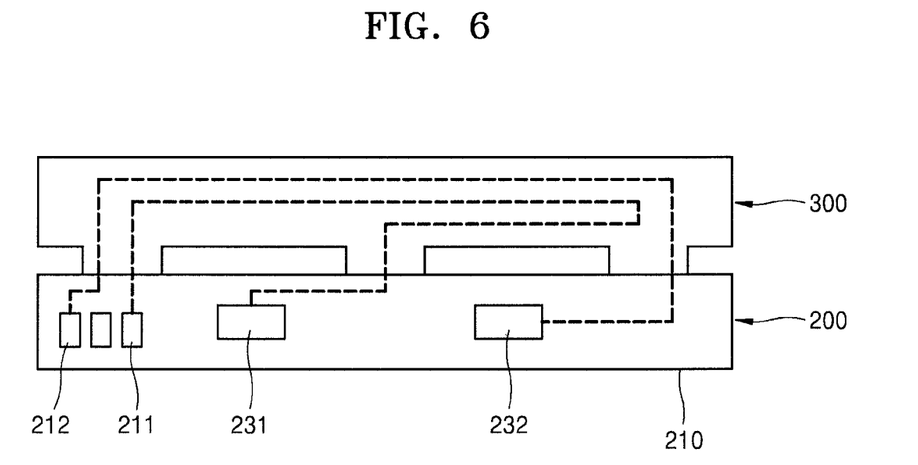
FIG. 6 is a schematic plan view of a circuit pattern for rapid charging in the circuit portion shown in FIG. 4A.
Figure 7:
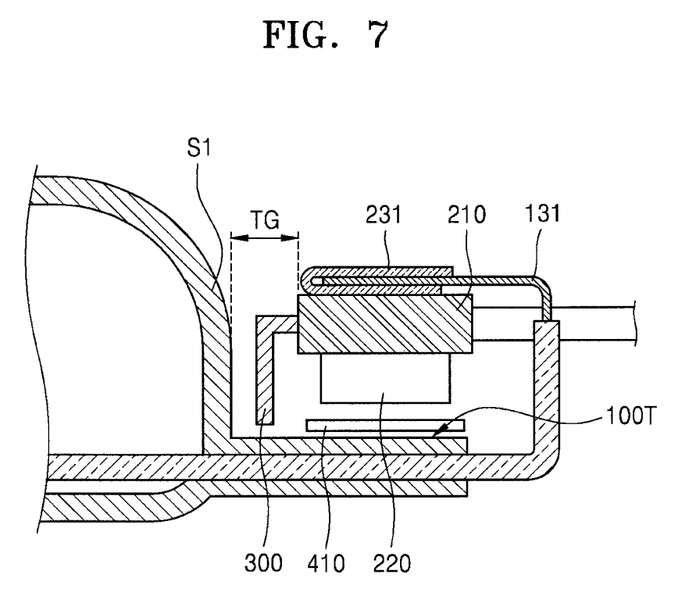
FIG. 7 is a cross-sectional view taken along the line VII-VII of FIG. 4B.

FIGS. 4A and 4B are perspective views illustrating a circuit structure including the rigid circuit portion 200 and the flexible circuit portion 300 and assembly processes of the battery cell 100, FIG. 5 is a perspective view of the circuit portion structure including the rigid circuit portion 200 and the flexible circuit portion 300 shown in FIG. 4A from a different angle, FIG. 6 is a schematic plan view of a circuit pattern for rapid charging in the circuit portion structure illustrated in FIG. 4A, and FIG. 7 is a cross-sectional view taken along the line VII-VII of FIG. 4B. In FIG. 6, the dashed lines denote circuit connections for performing the rapid charging.

Referring to FIGS. 4A and 5, the negative electrode lead 131 and the positive electrode lead 132 extend from (e.g., extend straight from) the pouch-type case 110 to be connected to the negative and positive connection portions 231 and 232 of the rigid circuit portion 200 at an initial stage of the assembly processes. The negative electrode lead 131 and the positive electrode lead 132 may be connected to the negative and positive electrode connection portions 231 and 232 by, for example, a welding process. The protective device 220 is arranged on a first surface of the circuit board 210 (see, e.g., FIG. 4A), and the negative and positive connection portions 231 and 232 may be arranged on (or in) a second surface of the circuit board 210 (see, e.g., FIG. 5).

The flexible circuit portion 300 may include a circuit pattern layer 310 including the circuit pattern and an insulating layer 320 covering the circuit pattern layer 310. The circuit pattern in the circuit pattern layer 310 is a bypass circuit pattern for rapid charging as described above, and the bypass circuit pattern may include a circuit pattern for connecting the external connection terminals 211 and 213 to the negative and positive connection portions 231 and 232 during the rapid charging. For example, as shown in FIG. 5, the circuit pattern for the rapid charging includes the bypass circuit pattern of the flexible circuit portion 300, and a sufficient line width for the rapid charging may be ensured.

As described above with reference to, for example, FIG. 4A, the negative and positive electrode leads 131 and 132 are respectively connected to the negative and positive electrode connection portions 231 and 232, and after that, the negative and positive electrode leads 131 and 132 are curved twice to have a U-shape. Then, as shown in FIG. 4B, the circuit board 210 of the rigid circuit portion 200 may be on (e.g., may be arranged on) the terrace portion 100T.

When the circuit board 210 is arranged on the terrace portion 100T after the negative and positive electrode leads 131 and 132 are curved, the flexible circuit portion 300 may be curved and arranged between the circuit board 210 and the first side surface S1 on the terrace portion 100T.

Referring to FIG. 6, the rigid circuit portion 200 and the flexible circuit portion 300 are arranged on the terrace portion 100T. The circuit board 210 of the rigid circuit portion 200 is arranged so that the first surface thereof on which the protective device 220 is mounted faces the terrace portion 100T, and the connection portion, for example, the negative electrode connection portion 231, is arranged on the second surface thereof, which is opposite the first surface. In some embodiments, the insulation sheet 410 may be interposed between the terrace portion 100T and the protective device 220.

In the terrace portion 100T, the circuit board 210 is spaced from (e.g., is spaced apart from) the first side surface S1 so that a gap TG is formed between the circuit board 210 and the first side surface S1. The flexible circuit portion 300 is curved to be arranged within the gap TG.

The curved flexible circuit portion 300 may function as a buffer for protecting the first side surface S1 against being torn or damaged due to the rigid circuit board 210. For example, the flexible circuit portion 300 may be curved once so that an end portion thereof may be parallel with the first side surface S1. FIG. 7 shows the flexible circuit portion 300 curved by an angle of about 90 degrees, but the present invention is not limited thereto. A curved portion of the flexible circuit portion 300 may have a gentle/smooth curved surface.

Figure 8:
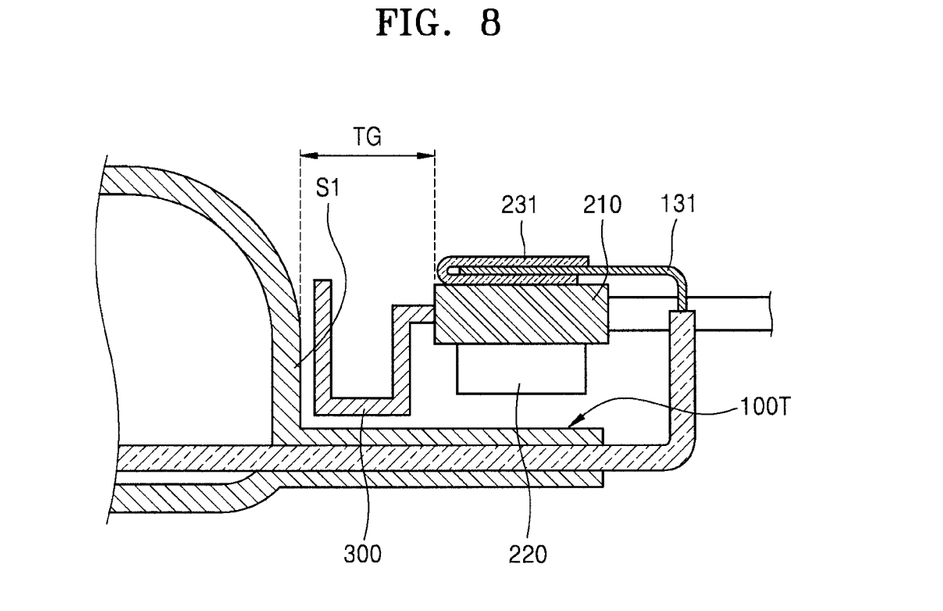
FIGS. 8 and 9 are cross-sectional views of modified examples of the embodiment shown in FIG. 7.
Figure 9:
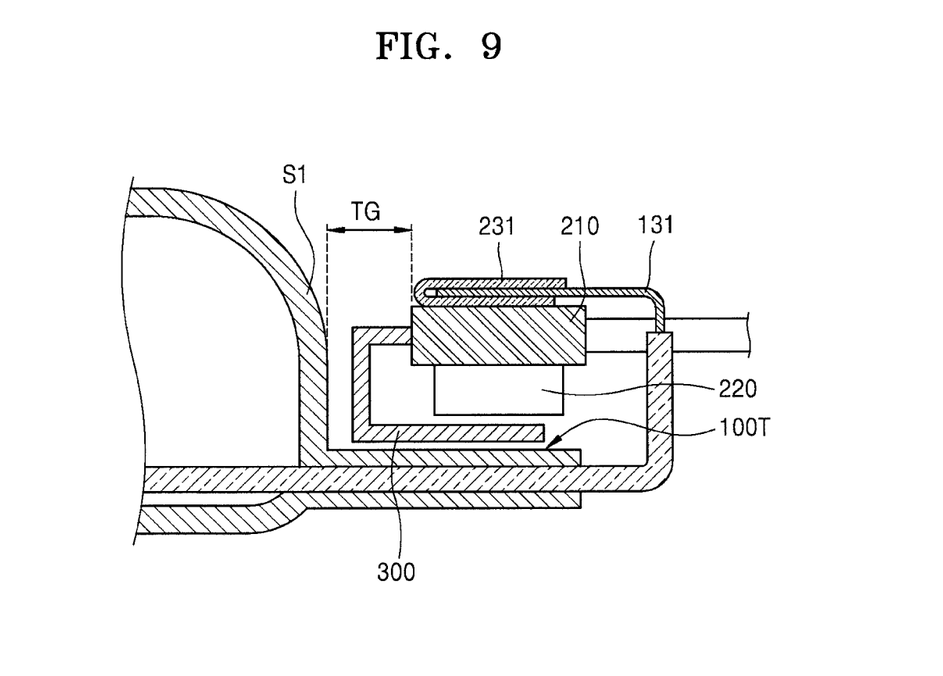

FIGS. 8 and 9 are cross-sectional views of modified examples of the embodiment shown in FIG. 7. FIGS. 8 and 9 show the flexible circuit portions 300 having different curved structures, and the differences therebetween will be primarily described below. In FIGS. 8 and 9, an insulation sheet is omitted for convenience of description.

Referring to FIG. 8, the flexible circuit portion 300 may be curved three times. For example, the flexible circuit portion 300 may be curved three times in a state where a first end portion thereof is connected to the circuit board 210. In the embodiment shown in FIG. 8, a second end portion of the flexible circuit portion 300 may be substantially parallel with the first side surface S1. Referring to FIG. 9, the flexible circuit portion 300 may be curved two times and the second end portion of the flexible circuit portion 300 may extend between the rigid circuit portion 200 and the terrace portion 100T (e.g., may extend between the protective device 220 and the terrace portion 100T). When the flexible circuit portion 300 extends between the protective device 220 and the terrace portion 100T, the insulation sheet 410 illustrated above with reference to FIG. 7 may be omitted.

In FIGS. 7-9, the flexible circuit portion 300 may be curved one, two, or three times, but the number of times the flexible circuit portion 300 is curved may be four times or greater.

Figure 10:
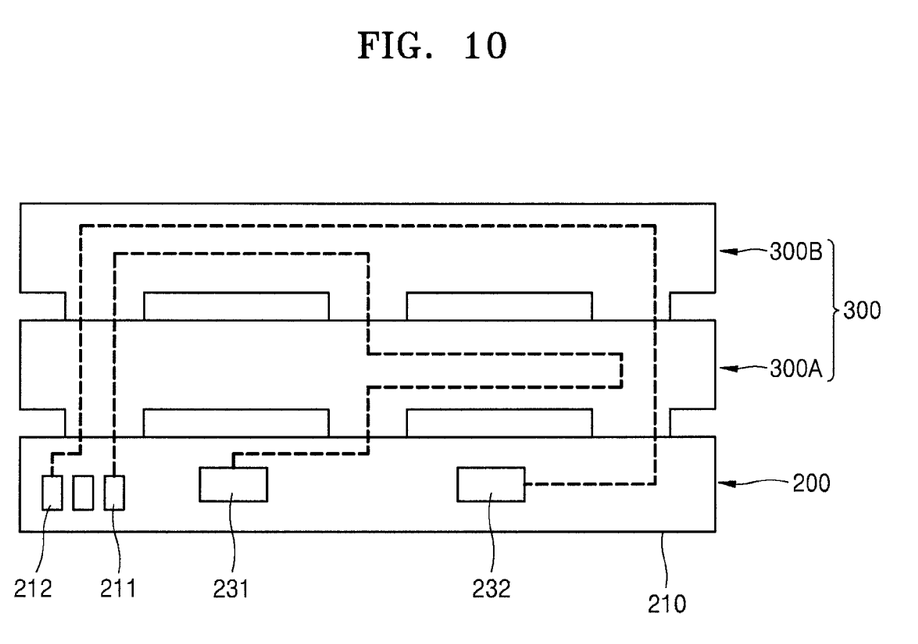
FIG. 10 is a plan view of a connection between a rigid circuit portion and a flexible circuit portion according to an embodiment.

FIG. 10 is a plan view of a connection between a rigid circuit portion 200 and a flexible circuit portion 300 according to an embodiment.

Referring to FIG. 10, the flexible circuit portion 300 includes a plurality of sub-flexible circuit portions. For example, the flexible circuit portion 300 may include a first sub-flexible circuit portion 300A and a second sub-flexible circuit portion 300B connected to the first sub-flexible circuit portion 300A. In such an embodiment, the bypass circuit pattern may be formed throughout the first and second sub-flexible circuit portions 300A and 300B (e.g., may be formed throughout the entire first and second sub-flexible circuit portions 300A and 300B).

According to the embodiments, the flexible circuit portion is curved to be arranged between the rigid circuit portion and the pouch-type case, and thus, the flexible circuit portion may function as a buffer between the rigid circuit portion and the pouch-type case when an external shock occurs to the second battery or when the secondary battery is vibrated. In addition, because the flexible circuit portion includes the bypass circuit pattern that is a part of the rapid charging circuit, a sufficient line width for performing the rapid charging may be ensured. However, the scope of the present invention is not limited to the above-described aspects and features.

According to the embodiments described in FIGS. 1-10, the battery cell 100 may be a pouch-type battery cell, but the present invention is not limited thereto. In other embodiments, battery cell 100 may be a prismatic battery cell, and the case may be a hexagonal can which has an opening covered by a cap plate.

It should be understood that the exemplary embodiments described herein should be considered in a descriptive sense only and not for purposes of limitation. Descriptions of features or aspects within each embodiment should typically be considered as available for other similar features or aspects in other embodiments.

While embodiments of the present invention have been described herein with reference to the figures, it will be understood by those of ordinary skill in the art that various changes in form and details may be made therein without departing from the spirit and scope as defined by the following claims and their equivalents.

What is claimed is:

1. A secondary battery comprising:
    an electrode assembly comprising a positive electrode plate, a negative electrode plate, and a separator between the positive electrode plate and the negative electrode plate;
    a case accommodating the electrode assembly;
    a negative electrode lead and a positive electrode lead extending from the case, the negative electrode lead and the positive electrode lead being respectively connected to the negative electrode plate and the positive electrode plate of the electrode assembly;
    a rigid circuit portion comprising a plurality of connection portions and an external connection terminal, the connection portions being respectively connected to the negative electrode lead and the positive electrode lead; and
    a flexible circuit portion comprising a bypass circuit pattern electrically connecting the connection portions and the external connection terminal of the rigid circuit portion to each other, the flexible circuit portion being curved between a first side surface of the case and the rigid circuit portion, wherein the rigid circuit portion is electrically connected between the electrode assembly and the flexible circuit portion, and
    wherein one of the plurality of connection portions and one of the plurality of external connection terminals are respectively at opposite ends of the bypass circuit pattern.

2. The secondary battery of claim 1, wherein the case comprises a metal thin film layer, a first insulating thin film layer on a first surface of the metal thin film layer, and a second insulating thin film layer on a second surface of the metal thin film layer opposite to the first surface.

3. The secondary battery of claim 1, wherein the flexible circuit portion comprises an insulation layer covering the bypass circuit pattern.

4. The secondary battery of claim 1, wherein the flexible circuit portion comprises:
    a first sub-flexible circuit portion directly connected to the rigid circuit portion; and
    a second sub-flexible circuit portion connected to the first sub-flexible circuit portion, and
    wherein the bypass circuit pattern extends through the first sub-flexible circuit portion and the second sub-flexible circuit portion.

5. The secondary battery of claim 1, wherein the flexible circuit portion is curved to be in a gap between the first side surface of the case and the rigid circuit portion.

6. The secondary battery of claim 1, wherein a first end portion of the flexible circuit portion is connected to the rigid circuit portion, and a second end portion of the flexible circuit portion opposite to the first end portion extends substantially parallel to the first side surface.

7. The secondary battery of claim 1, wherein the case is a pouch-type case comprising a terrace portion that extends from a side surface of the case.

8. The secondary battery of claim 7, wherein a first end portion of the flexible circuit portion is connected to the rigid circuit portion, and a second end portion of the flexible circuit portion opposite to the first end portion is between the rigid circuit portion and the terrace portion.

9. The secondary battery of claim 7, wherein the rigid circuit portion comprises:
   a circuit board parallel to the terrace portion; and
   a protective device on a first surface of the circuit board that faces the terrace portion.

10. The secondary battery of claim 9, wherein the connection portions are on a second surface of the circuit board that is opposite the first surface.

* * * * *